US012791112B2

(12) United States Patent
Bousfield et al.

(10) Patent No.: US 12,791,112 B2
(45) Date of Patent: Nov. 10, 2026

(54) IRRIGATION DEVICE, VALVE ASSEMBLY, AND OUTLET

(71) Applicant: Rain Bird Corporation, Azusa, CA (US)

(72) Inventors: Randall Dennis Bousfield, Tucson, AZ (US); Ray Samuel Peppiatt, Oro Valley, AZ (US)

(73) Assignee: Rain Bird Corporation, Azusa, CA (US)

( * ) Notice: Subject to any disclaimer, the term of this patent is extended or adjusted under 35 U.S.C. 154(b) by 576 days.

(21) Appl. No.: 17/532,604

(22) Filed: Nov. 22, 2021

(65) Prior Publication Data

US 2023/0160489 A1 May 25, 2023

(51) Int. Cl.
*F16K 27/04* (2006.01)
*A01G 25/16* (2006.01)

(52) U.S. Cl.
CPC .......... *F16K 27/041* (2013.01); *A01G 25/165* (2013.01)

(58) Field of Classification Search
CPC ..................................................... F16K 27/041
See application file for complete search history.

(56) References Cited

U.S. PATENT DOCUMENTS 3,912,167 A 10/1975 Simon
4,004,258 A 1/1977 Arnold
4,093,280 A * 6/1978 Yoshizawa ............. F16L 47/24 285/915
4,108,419 A 8/1978 Sturman
4,130,135 A 12/1978 Moore
4,280,530 A 7/1981 Yi
4,526,198 A 7/1985 Scott
D281,808 S 12/1985 Lemkin
4,592,505 A 6/1986 Bruninga
4,633,905 A 1/1987 Wang
4,708,264 A 11/1987 Bruninga
4,722,478 A 2/1988 Fletcher
D295,779 S 5/1988 Bruninga
D295,890 S 5/1988 Bruninga
4,744,515 A 5/1988 Watanabe
D298,962 S 12/1988 Bruninga
4,797,820 A 1/1989 Wilson
4,807,664 A 2/1989 Wilson
4,858,827 A 8/1989 Fletcher
D304,224 S 10/1989 Wilson
4,873,650 A 10/1989 Reeves, Jr.
4,921,001 A 5/1990 Pittsinger
5,074,468 A 12/1991 Yamamoto
(Continued)

OTHER PUBLICATIONS

2006 Orbit SunMate Installation and User's Guide, pp. 1-2.
(Continued)

*Primary Examiner* — Craig M Schneider
(74) *Attorney, Agent, or Firm* — Fitch, Even, Tabin & Flannery, LLP

(57) ABSTRACT

An irrigation valve assembly is provided, such as for use in a hose end timer or other irrigation device. In one form, the irrigation valve assembly includes an inlet, an outlet, and a molded valve body coupled to the inlet and the outlet and defining a flow passage from the inlet to the outlet. The inlet couples the irrigation valve assembly to a water source. The outlet includes a metal outlet body including a threaded portion, such as for coupling to a house. The metal outlet body includes at least one projection embedded at least partially into the molded valve body for coupling the metal outlet body to the molded valve body. An irrigation device and an outlet for an irrigation device are also provided.

9 Claims, 20 Drawing Sheets

(56) References Cited

U.S. PATENT DOCUMENTS 5,082,022 A 1/1992 Boundy
5,101,859 A 4/1992 Roman
5,109,929 A 5/1992 Spears
5,135,168 A 8/1992 Wang
5,213,303 A 5/1993 Walker
5,262,936 A 11/1993 Faris
5,286,001 A 2/1994 Rafeld
5,341,843 A 8/1994 Rafeld
5,402,812 A 4/1995 Moineau
5,437,481 A 8/1995 Spears
5,470,043 A 11/1995 Marts
D365,771 S 1/1996 Clivio
D386,985 S 12/1997 Cameron
5,746,250 A 5/1998 Wick
5,826,619 A 10/1998 Roman
5,915,665 A 6/1999 Paese
5,921,280 A 7/1999 Ericksen
5,960,813 A 10/1999 Sturman
6,053,416 A 4/2000 Specht
D430,044 S 8/2000 Clivio
D431,195 S 9/2000 Clivio
6,186,558 B1 2/2001 Komolrochanaporn
6,257,264 B1 7/2001 Sturman
6,283,139 B1 9/2001 Symonds
D451,037 S 11/2001 Jacobs
D451,411 S 12/2001 Jacobs
D451,412 S 12/2001 Jacobs
6,337,635 B1 1/2002 Ericksen
6,397,888 B1 6/2002 Wang
6,406,068 B1 6/2002 Bartholoma
6,460,563 B2 10/2002 Olson
D467,187 S 12/2002 Clivio
6,511,099 B2 1/2003 Mario
6,547,211 B2 4/2003 Roman
D477,287 S 7/2003 Roman
6,619,614 B2 9/2003 Parsons
D485,502 S 1/2004 Clivio
6,691,979 B2 2/2004 Parsons
6,694,223 B1 2/2004 Goldberg
6,719,010 B1 4/2004 Yi-Chang
6,749,136 B1 6/2004 Wilson
6,827,288 B2 12/2004 Noelke
6,955,333 B2 10/2005 Patterson
6,986,364 B1 1/2006 Wang
6,989,364 B1 1/2006 Jin
7,121,477 B1 10/2006 Noelke
7,156,363 B2 1/2007 Parsons
7,201,187 B2 4/2007 Irwin
7,203,576 B1 4/2007 Wilson
7,252,113 B2 8/2007 Jacobs
7,286,904 B2 10/2007 Graham
D559,708 S 1/2008 Michael
D567,680 S 4/2008 Michael
D567,681 S 4/2008 Michael
7,383,721 B2 6/2008 Parsons
7,396,000 B2 7/2008 Parsons
7,404,415 B2 7/2008 Jacobs
7,426,784 B2 9/2008 Spears
7,437,778 B2 10/2008 Parsons
7,458,613 B2 12/2008 Spears
7,503,348 B2 3/2009 Irwin
7,527,302 B2 5/2009 Lewis
7,543,855 B2 6/2009 Ambrosi
7,562,399 B2 7/2009 Parsons
D604,183 S 11/2009 Zore
D604,184 S 11/2009 Leer
7,619,322 B2 11/2009 Gardner
7,637,475 B2 12/2009 Adams
7,731,154 B2 6/2010 Parsons
7,735,513 B2 6/2010 Bush
7,761,189 B2 7/2010 Froman
7,810,515 B2 10/2010 Nies
7,921,480 B2 4/2011 Parsons
7,931,045 B2 4/2011 Nies
7,988,204 B2 8/2011 Lewis
D647,411 S 10/2011 Barton
8,042,202 B2 10/2011 Parsons
8,104,509 B2 1/2012 Leer
8,172,275 B2 5/2012 Sumrall, Jr.
8,251,300 B2 8/2012 Wilson
8,276,878 B2 10/2012 Parsons
8,403,186 B2 3/2013 Kurosawa
8,505,836 B2 8/2013 Mayher
8,613,220 B2 12/2013 Ball
8,695,902 B2 4/2014 Mayher
8,840,148 B2 9/2014 DeFilippi
8,910,887 B2 12/2014 Helmsderfer
8,955,822 B2 2/2015 Parsons
9,052,023 B2 6/2015 Janousek
9,289,819 B2 3/2016 Janousek
9,597,699 B2 3/2017 Helmsderfer
9,664,325 B2 5/2017 Yamada
9,708,798 B2 7/2017 Huelsman
9,708,799 B2 7/2017 Huelsman
9,709,202 B2 7/2017 Spears
9,724,708 B2 8/2017 Helmsderfer
9,822,514 B2 11/2017 Parsons
10,125,903 B1 11/2018 Doran
10,132,436 B2 11/2018 Lehmann
10,143,616 B2 12/2018 Posener
10,443,728 B1 10/2019 Oman
10,487,972 B1 11/2019 Price
10,525,487 B2 1/2020 Helmsderfer
10,697,573 B2 6/2020 Bassett
10,744,527 B2 8/2020 Jackson
10,767,795 B2 9/2020 Warren
10,781,578 B2 9/2020 Lin
11,002,393 B1 5/2021 Oman
11,154,890 B2 10/2021 Tezino, Jr.
D935,902 S 11/2021 Huang
11,297,784 B2 4/2022 Chen
11,408,527 B2 * 8/2022 Nguyen .................. F16L 47/24
11,624,467 B2 4/2023 Terry
11,662,047 B2 5/2023 Robert
12,313,193 B2 5/2025 Berger
12,449,069 B2 10/2025 Scholder
12,449,082 B2 10/2025 McKaigue
2005/0060065 A1 3/2005 King-Yuan
2005/0082503 A1 4/2005 Patterson
2005/0167625 A1 8/2005 Deen
2005/0199842 A1 9/2005 Parsons
2008/0106092 A1 5/2008 Klein
2008/0251601 A1 10/2008 Nies
2008/0255708 A1 10/2008 Nies
2009/0001193 A1 1/2009 Parsons
2009/0008472 A1 1/2009 Wilson
2009/0025807 A1 1/2009 August
2009/0126801 A1 5/2009 Grill
2009/0179165 A1 7/2009 Parsons
2010/0163126 A1 7/2010 Leer
2010/0198418 A1 8/2010 Williams
2010/0230510 A1 9/2010 Wilson
2011/0089351 A1 4/2011 Spadotto
2011/0118881 A1 5/2011 Tai
2011/0215168 A1 9/2011 Mayher
2011/0226363 A1 9/2011 Yu
2011/0309274 A1 12/2011 Parsons
2013/0214531 A1 8/2013 McAllister
2014/0069506 A1 3/2014 Helmsderfer
2016/0345515 A1 12/2016 Helmsderfer
2017/0015054 A1 1/2017 Born
2019/0323625 A1 * 10/2019 Niess ........................ F16K 7/17
2023/0160489 A1 5/2023 Bousfield
2025/0216013 A1 7/2025 Schavey

OTHER PUBLICATIONS

2006 User's Manual: Sprinkler timers by Orbit, pp. 1-19, 52 and 53.
2007 Installation manual/User's Manual: Sprinkler Timers by Orbit, pp. 1-22.
2007 Orbit Battery Operated Sprinkler Timer with Inline Valve User manual, pp. 1-8.
2007 Orbit Installation Manual/ User's Manual, pp. 1-2.

(56) References Cited

OTHER PUBLICATIONS

2007 Orbit ST2-RF Sprinkler Timer Manual, pp. 1-19.
2007 Orbit Touch-Screen Timer Manual, pp. 1-16.
Rain Bird 1ZEHTMR Hose-End Timer User Manual, published Jul. 2012, pp. 1-2.
Rain Bird Hose End Timer Troubleshooting Guide, published Dec. 2021, p. 1.
Westlake Pipe and Fittings; "Heavy Turf Male Brass Stabilizer Elbow"; https://www.lascofittings.com/category/heavyturfmalebrass-stabilizerelbow; 2021 (3 pages) (document illustrates Heavy Turf Male Brass Stabilizer Elbows that were on sale or publicly available prior to the filing of the instant application).
Dura Plastics Products, LLC; "FS x Brass Mipt"; https://www.duraplastics.com/product/fs-x-brass-mipt/ (2 pages) (document illustrates an FS x Brass Mipt product that was on sale or publicly available prior to the filing of the instant application).
Spears Manufacturing Company; "EverTUFF® TURF™ Swing Joint"; https://www.spearsmfg.com/evertuff_turf/009-TURFTECH_TURF_SJO_T.pdf (21 pages) (document illustrates a Metal Female Thread 90° Ell Outlet on p. 6 that was on sale or publicly available prior to the filing of the instant application).
Westlake Pipe and Fittings; "Heavy Turf Male Brass Stabilizer Elbow"; https://web.archive.org/web/20201202191924mp_/https://www.lascofittings.com/category/heavyturfmalebrass-stabilizerelbow; 2020 (4 pages) (document illustrates Heavy Turf Male Brass Stabilizer Elbows that were on sale or publicly available prior to the filing of the instant application).
Westlake Pipe and Fittings; "Heavy Turf Male Brass Stabilizer Elbow"; three illustrations of the unassembled outlet of the Heavy Turf Male Brass Stabilizer Elbow shown at https://web.archive.org/web/20201202191924mp_/https://www.lascofittings.com/category/heavyturfmalebrassstabilizerelbow; 2020 (1 page) (on sale or publicly available prior to the filing of the instant application).

* cited by examiner

IRRIGATION DEVICE, VALVE ASSEMBLY, AND OUTLET

FIELD

This invention relates generally to irrigation devices and, more particularly, to valve assemblies and outlets suitable for use in irrigation devices.

BACKGROUND

Irrigation devices are generally known in the field of irrigation for use in delivering irrigation water from water sources to desired areas. One example of an irrigation device is a hose end timer, which is generally known for use in delivering irrigation water at scheduled times and time intervals, thereby conserving water. In some forms, the body of the hose end timer is formed of molded plastic for convenience of manufacturing and use by consumers. The hose end timer is generally disposed at a water source and controls the flow of water from the water source via a valve. Water may be delivered at a controlled rate and at a scheduled time through a hose to emission devices, which, in turn, irrigate vegetation or targeted terrain.

A hose end timer may be connected at one end to a faucet spigot through which water is supplied. The other end of the hose end timer may be connected to a hose for delivery of water to emission devices. The hose end timer needs to have secure couplings at both ends in order to avoid leakage.

For hose end timers, it has been observed that, over time, the threaded ends of the hose end timer may deteriorate or become damaged. When fastening the hose end timer to either the faucet spigot or hose, it has been observed that constant tightening (and possibly overtightening) of the ends of the hose end timer may lead to wear and tear or cross-threading. It has also been observed that the threaded ends may become damaged when the hose end timer is first installed or due to instances of rough handling. In response to this damage, however caused, the hose end timer may leak significantly or even stop functioning properly.

It is desirable to avoid having to replace irrigation devices due to stress or damage at the ends of the irrigation device. Thus, there is a need for an irrigation device where threaded ends will resist this stress or damage and that will thereby extend the useful life of the irrigation device. Further, there is a need for an irrigation device where these threaded ends can be formed in combination with the molded plastic body of the device.

DESCRIPTION OF THE PREFERRED EMBODIMENTS

Figure 1:
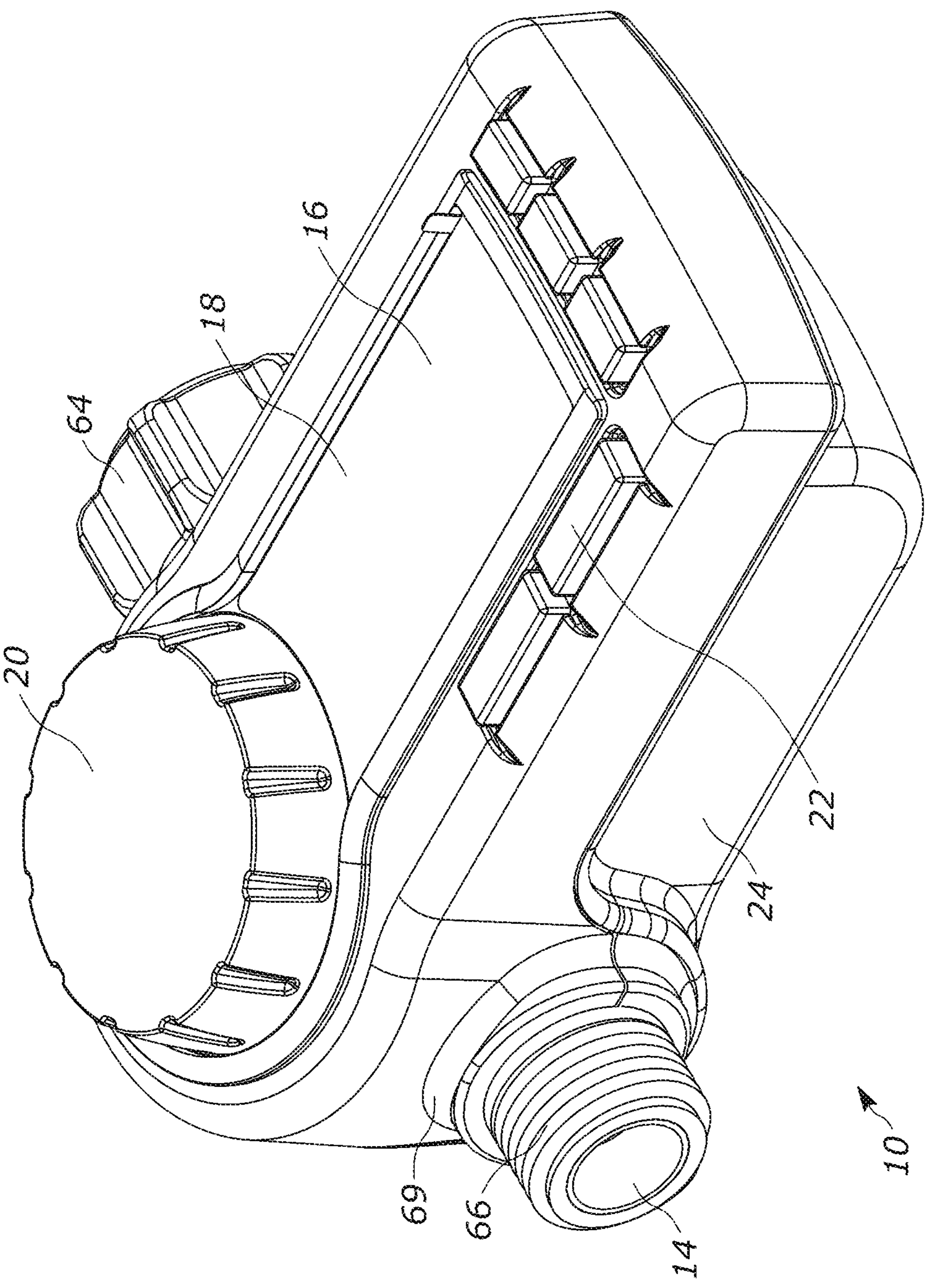
FIG. 1 is a perspective view of an embodiment of a hose end timer embodying features of the present invention.
Figure 2:
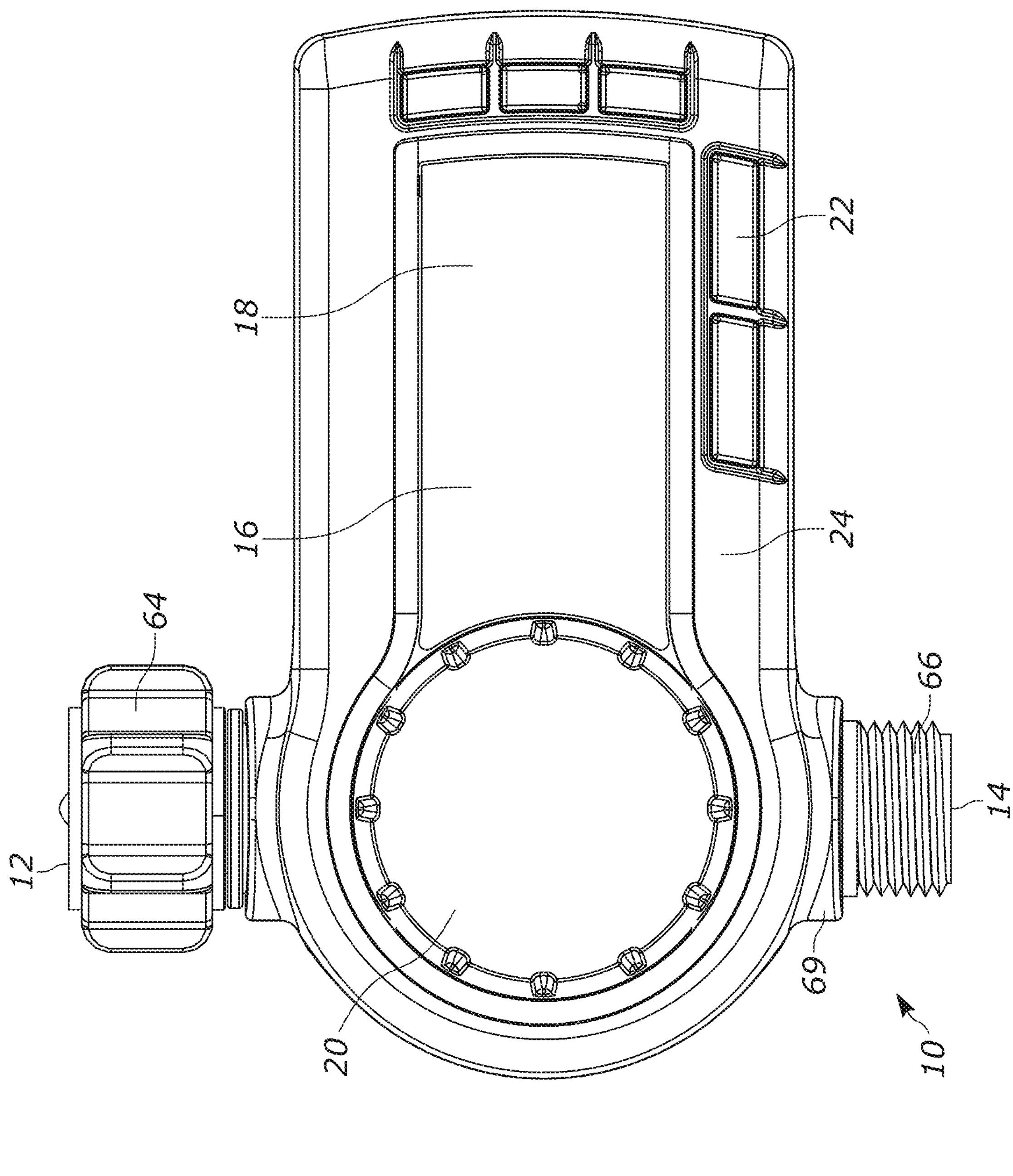
FIG. 2 is a front view of the hose end timer of FIG. 1.
Figure 3:
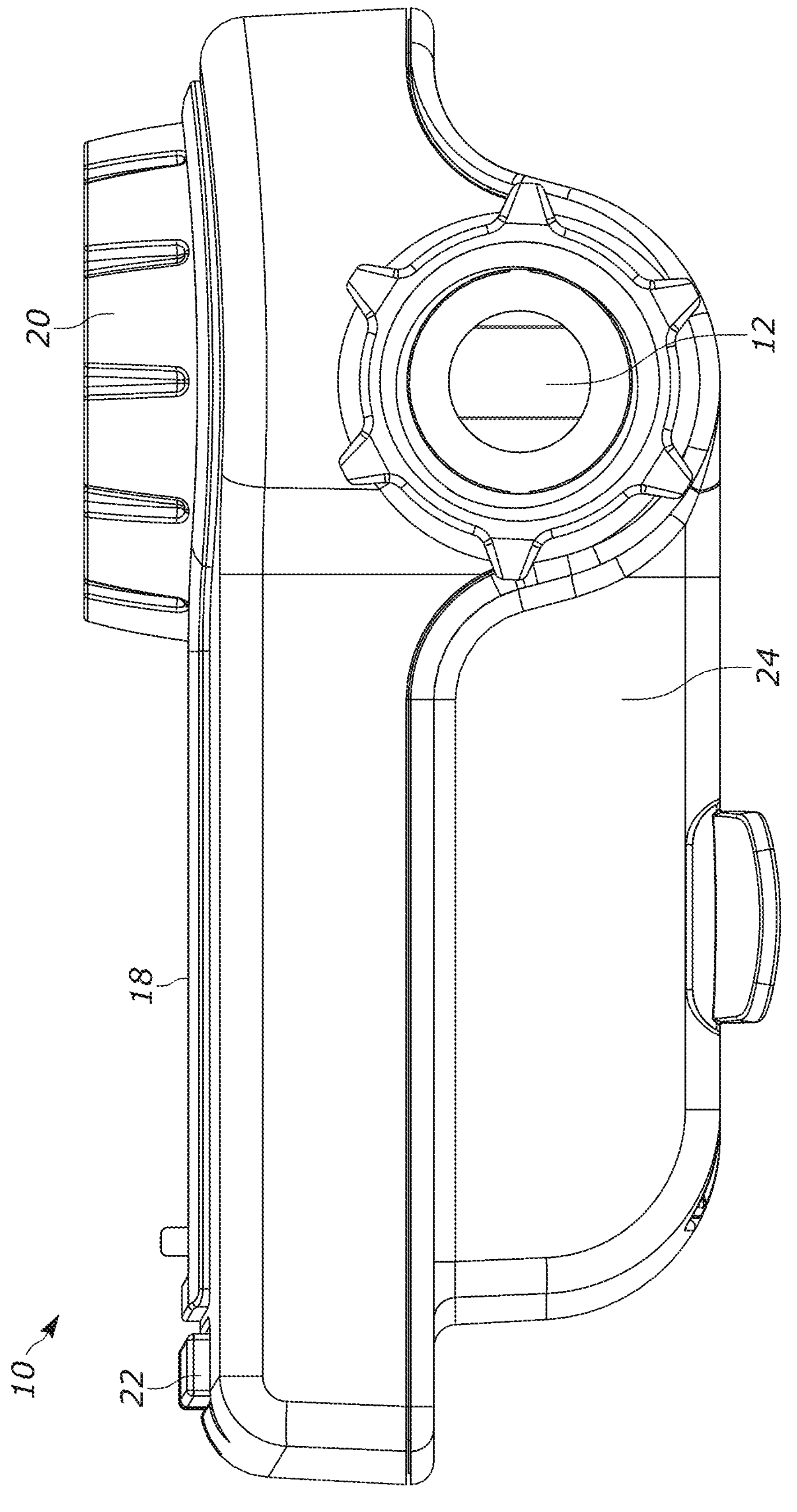
FIG. 3 is a top view of the hose end timer of FIG. 1.
Figure 4:
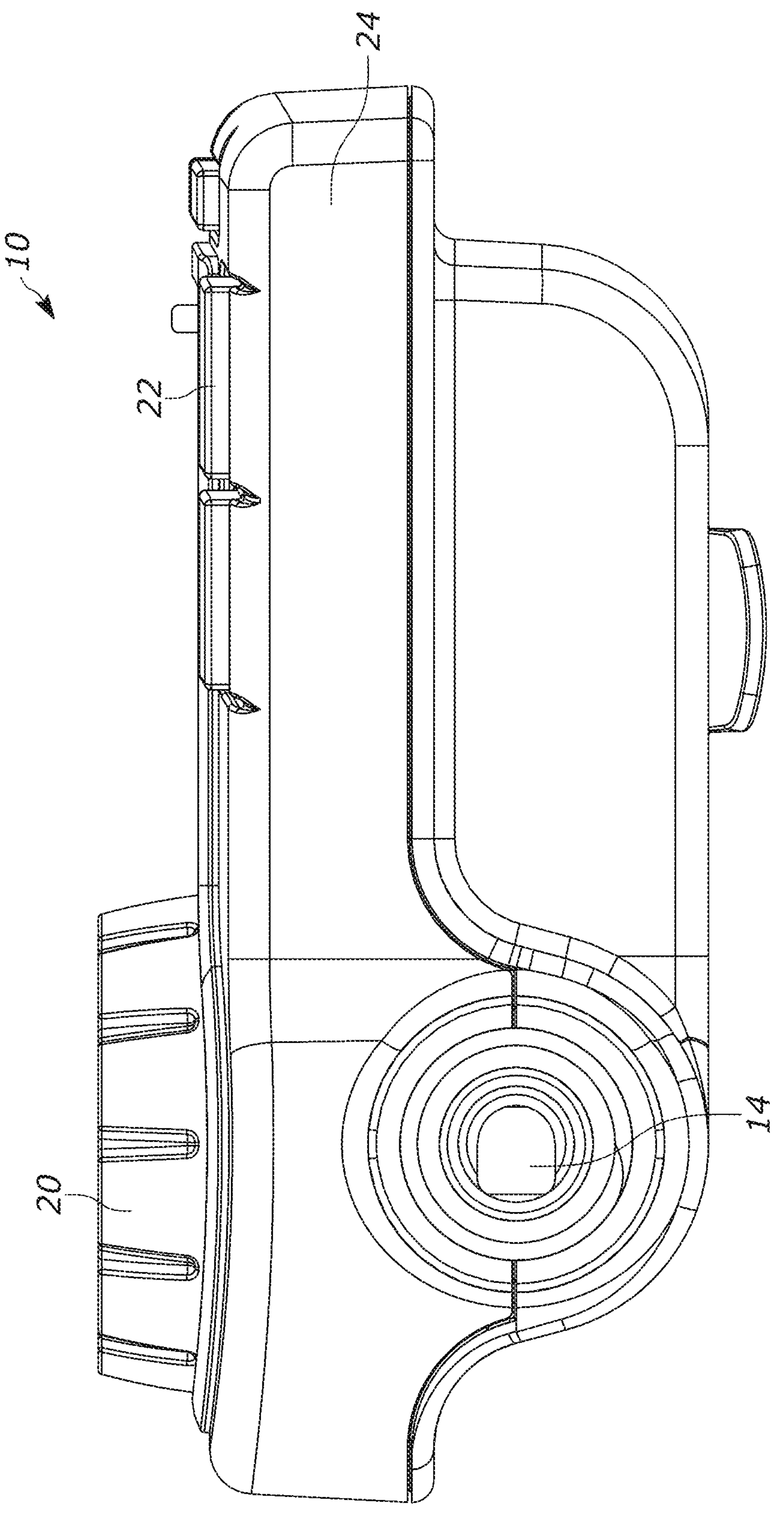
FIG. 4 is a bottom view of the hose end timer of FIG. 1.
Figure 5:
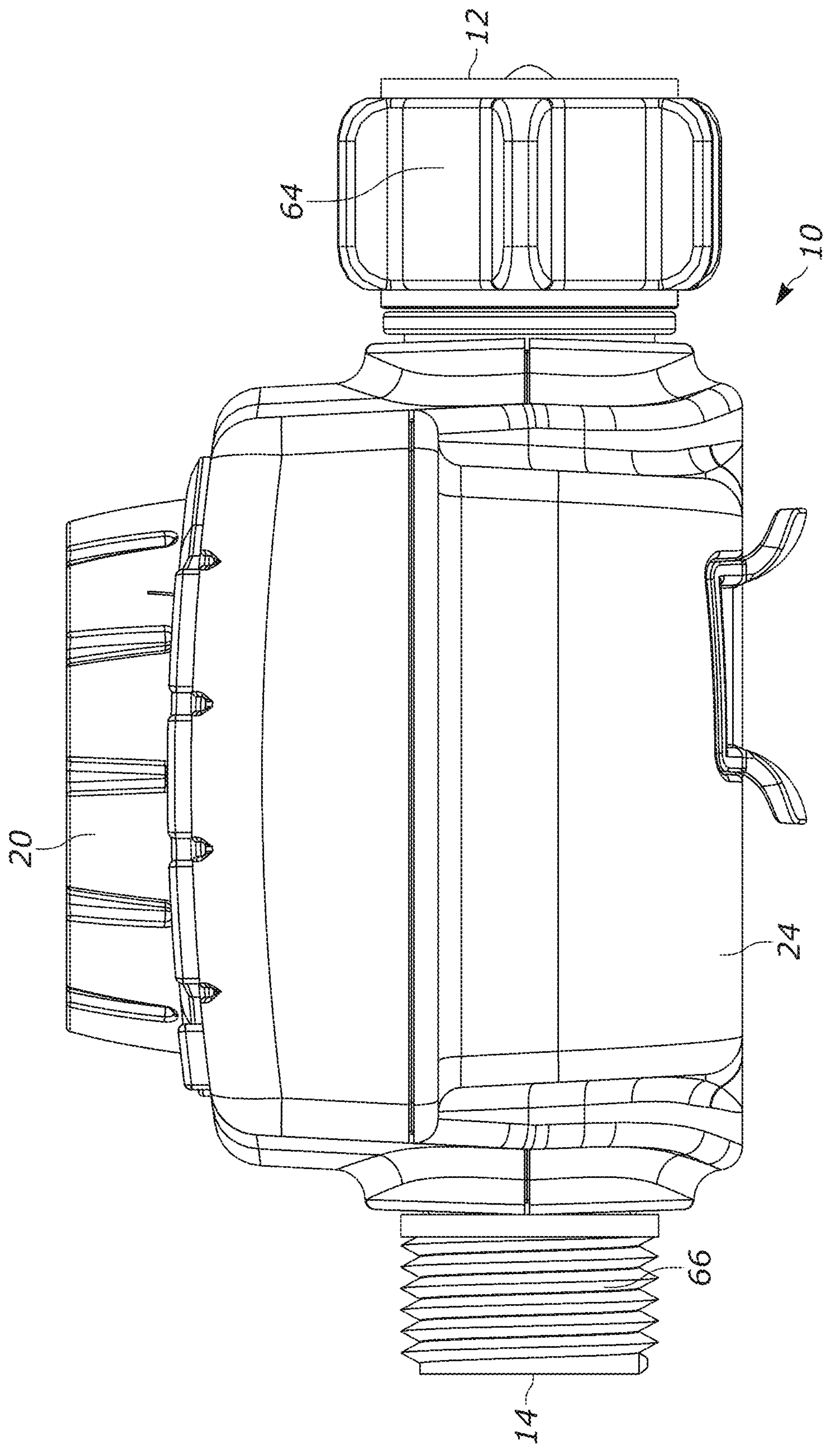
FIG. 5 is a side elevational view of the hose end timer of FIG. 1.
Figure 6:
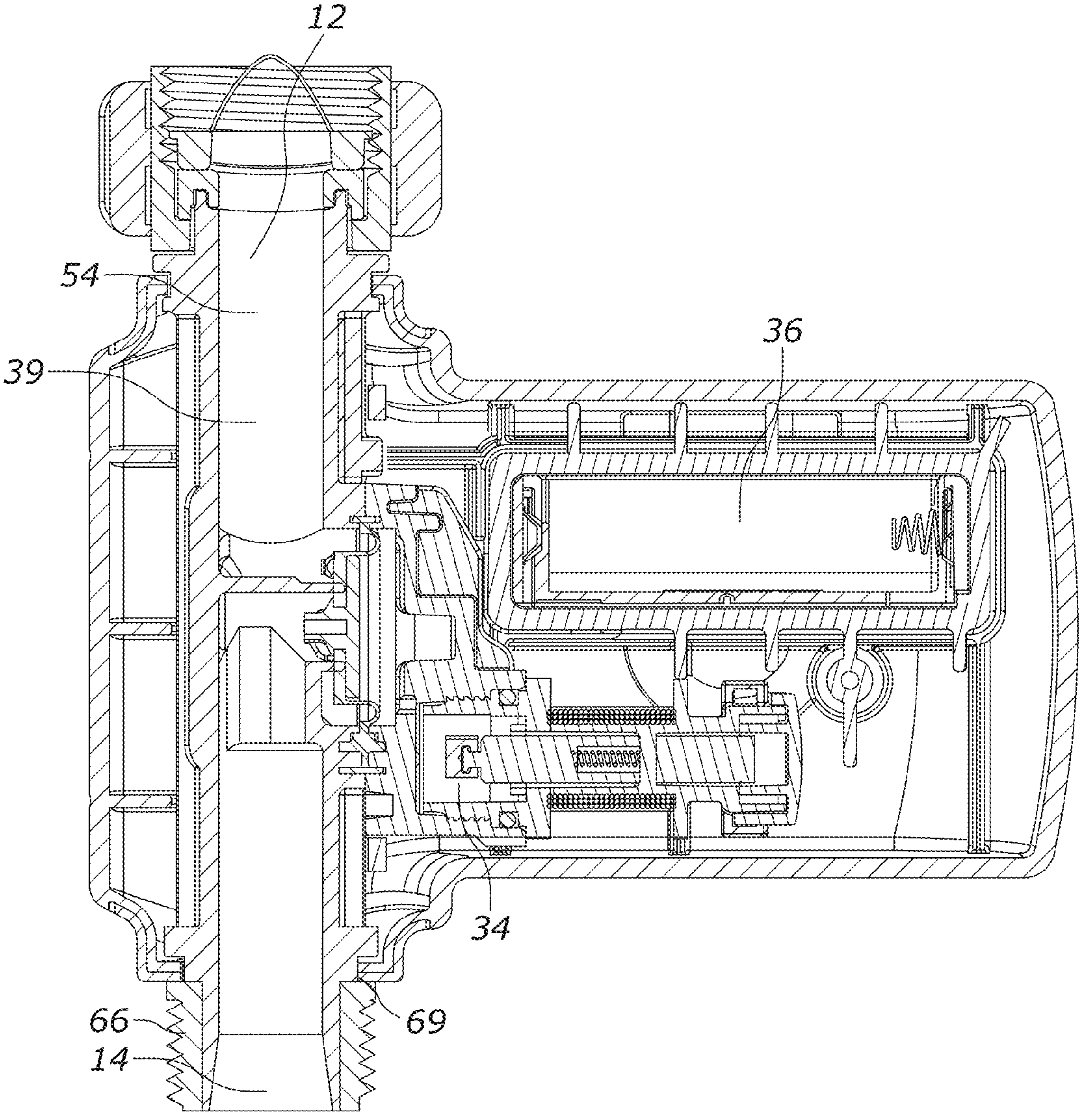
FIG. 6 is a cross-sectional view of the hose end timer of FIG. 1.

With respect to FIGS. 1-8, an irrigation device in the form of a hose end timer 10 is shown for use in scheduling the delivery of irrigation water or fluid from a water source and through the hose end timer 10. In one form, it is contemplated that one end of the hose end timer 10 may be connected to a faucet spigot, such as may be located on the exterior of a house or building. The other end of the hose end timer 10 may be connected to a hose, which in turn may be coupled to an emission device. The hose end timer 10 is used to schedule and control the flow of water from the faucet spigot to and through the hose.

As shown in FIGS. 1-8, in one preferred form, the hose end timer 10 includes an inlet 12, an outlet 14, and a user interface 16. A user may connect the inlet 12 to a standard hose faucet spigot and connect the outlet 14 to one end of a hose, such as, for example, a standard garden hose. In turn, the other end of the hose may be attached to an irrigation device. The hose end timer 10 generally allows the user to provide input through the user interface 16 to adjust various settings, such as, for example, adjusting a clock, automatic/manual operation, the time for irrigation, the duration of the irrigation, the frequency of irrigation, and a rain delay.

The user interface 16 preferably includes an electronic display screen 18, a rotary dial 20 (or mode knob), and push buttons 22. The display screen 18 is covered by a protective and transparent covering (or film) 19 and shows relevant timer information, such as, for example, time of day, day of the week, and the battery power level. The transparent covering 19 may be removed upon installation of the hose end timer. The rotary dial 20 allows a user to select a mode for setting timer information, including, for example, setting the clock, the start time, and the duration of irrigation. Push buttons 22 on the interface 16 allow the user to adjust the settings up and down. Other push buttons 22 may provide a manual override to allow the user to irrigate immediately or to set a rain delay.

Figure 7:
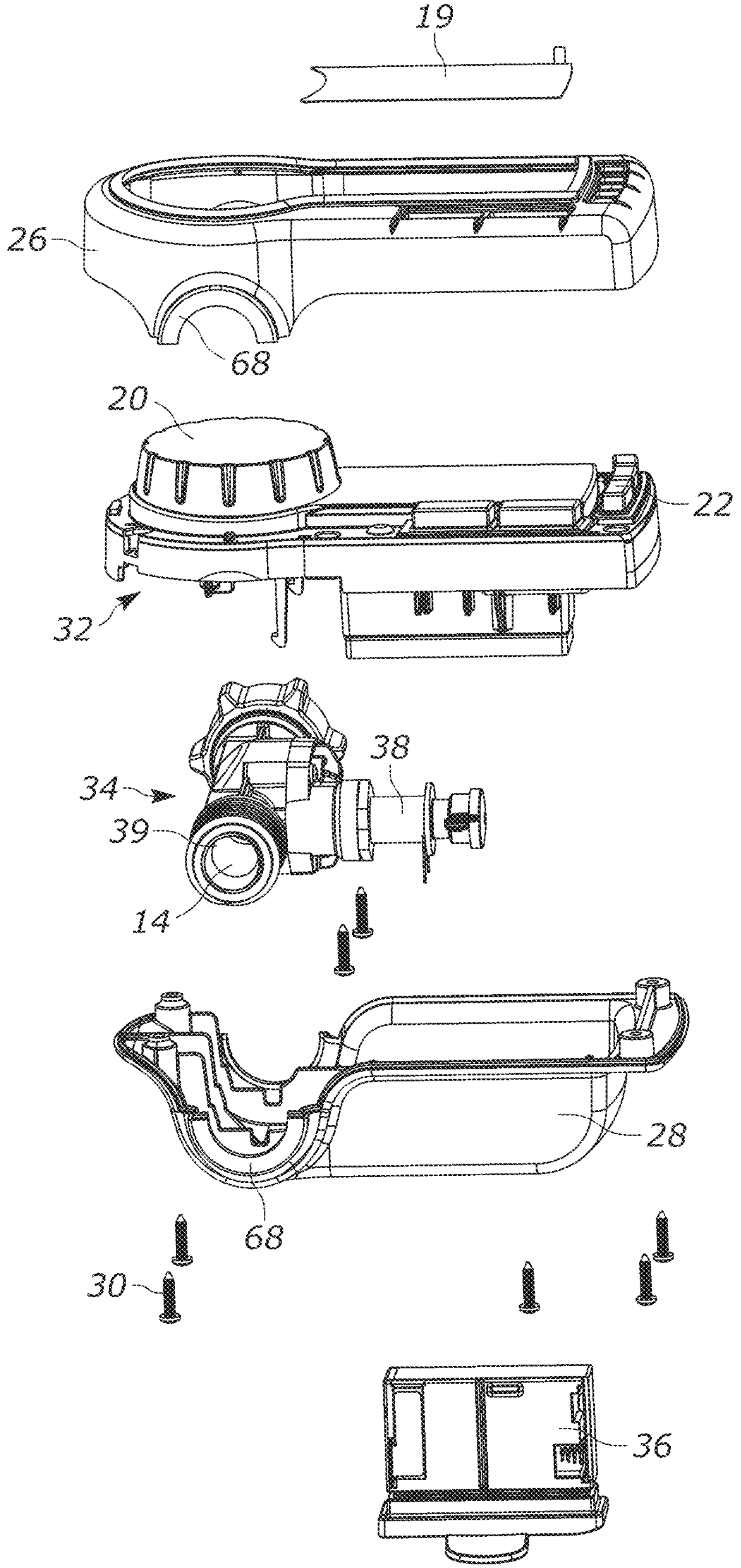
FIG. 7 is a top exploded view of the hose end timer of FIG. 1.
Figure 8:
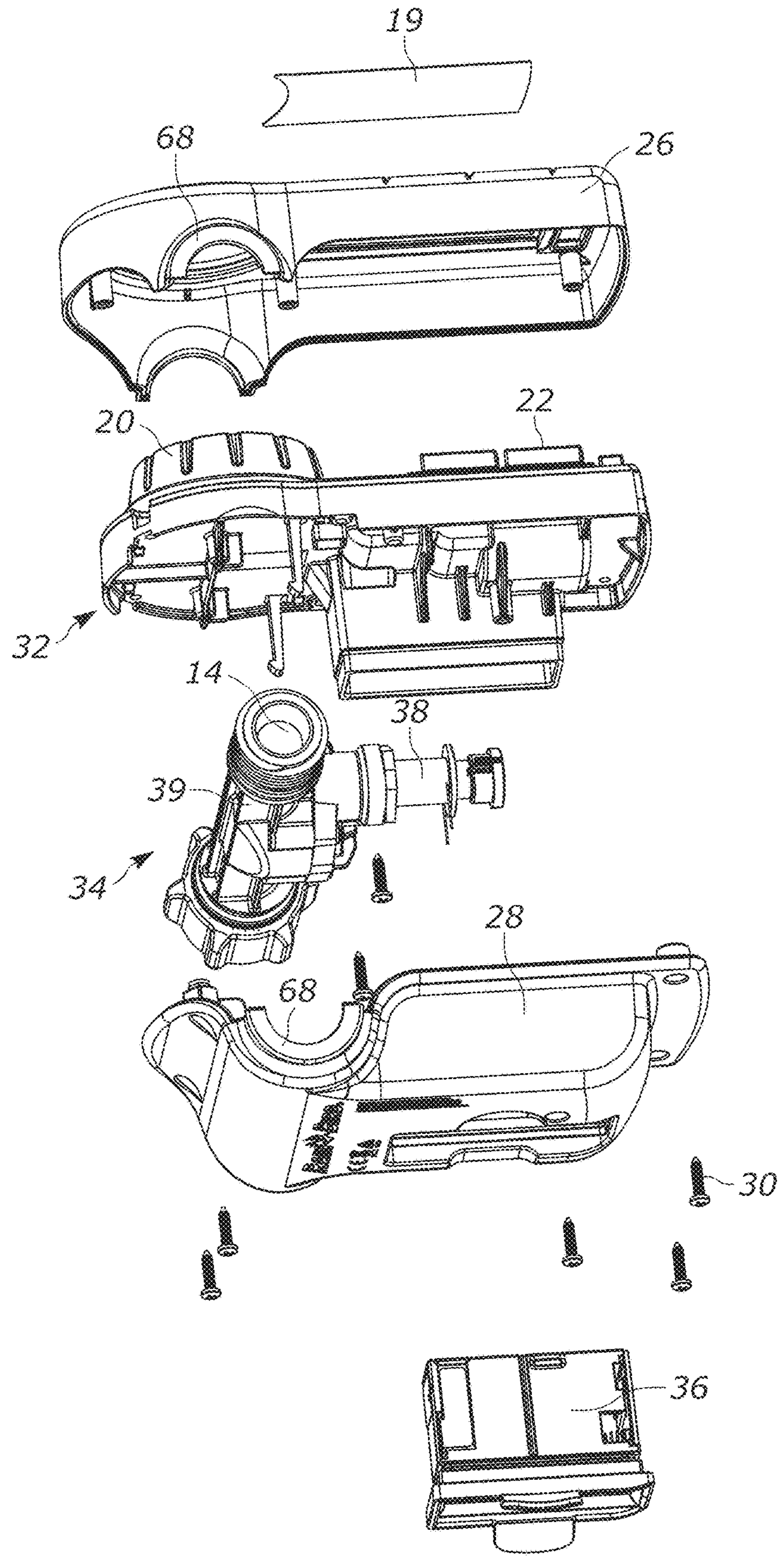
FIG. 8 is a bottom exploded view of the hose end timer of FIG. 1.

The housing 24 of the hose end timer 10 contains and protects the components therein. As shown in FIGS. 7 and 8, the housing 24 is preferably composed of an upper housing 26 and a lower housing 28 that are fastened to one another by screws 30 or other fasteners. In this particular example, the hose end timer 10 also includes an inner shelf assembly 32, a solenoid-actuated valve assembly 34, and a removable battery tray 36 that may be inserted through the lower the housing 28.

The inner shelf assembly 32 supports the rotary dial 20 and push buttons 22 thereon, and it preferably includes a circuit board disposed therein. The circuit board provides the control circuitry for opening and closing the valve assembly 34 in response to user input and commands. Among other things, the control circuitry opens and closes the valve assembly 34 to allow irrigation at predetermined times for predetermined durations. Batteries preferably provide the power source for actuation of the valve assembly 34. The power demand of the valve assembly 26 is preferably low in order to maximize battery life.

Various features, settings, and functionality (such as, for example, a manual override) have been described above. It should be understood, however, that these are simply examples and are not intended as limitations on the irrigation device. Some or all of the above features and settings are not required in the irrigation device. In certain forms, it is contemplated that a limited number of features and settings may be incorporated into the irrigation device, as desired. Further, in other forms, additional or different features and settings may be utilized in the irrigation device.

Figure 9:
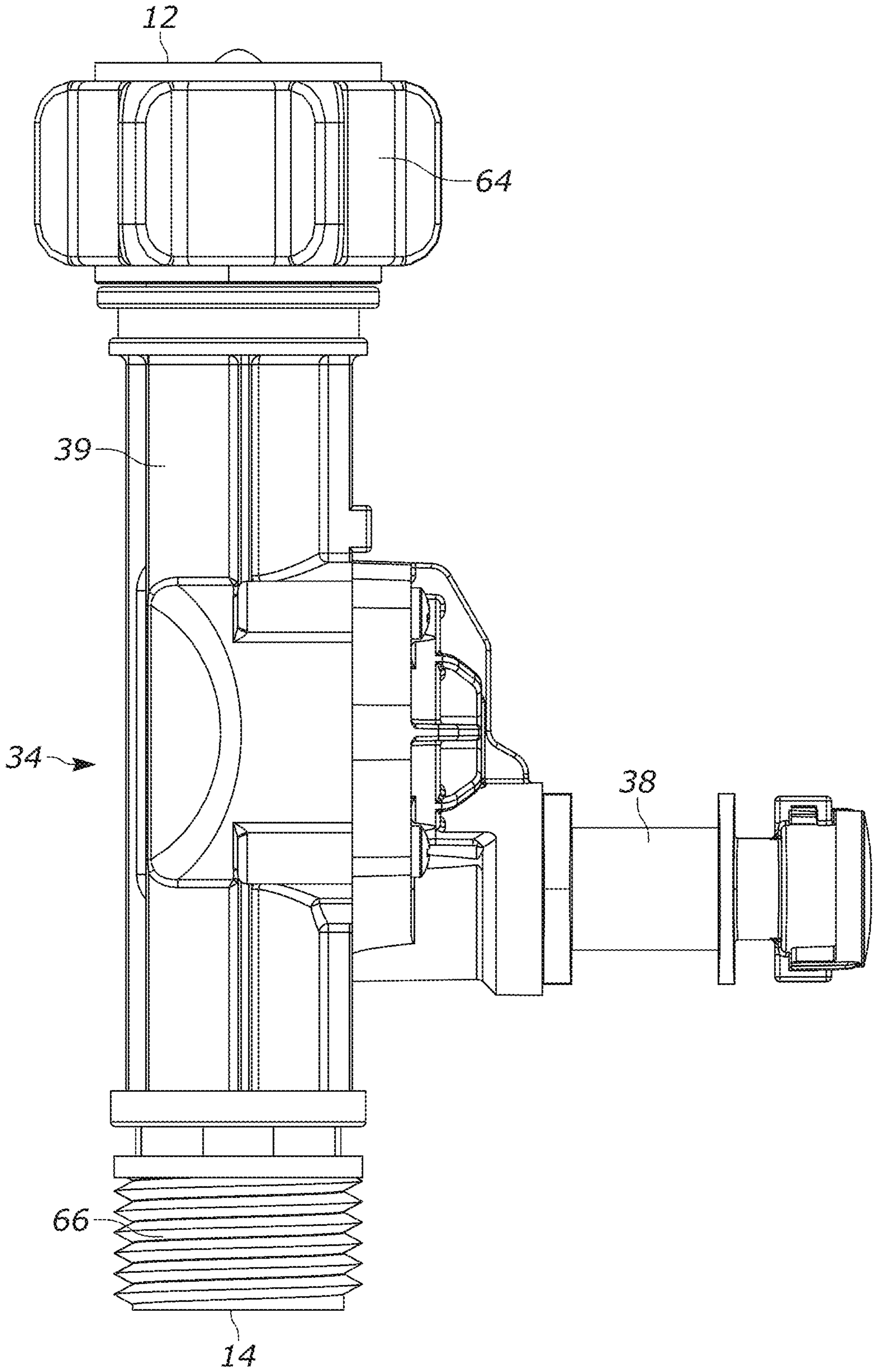
FIG. 9 is a front view of a solenoid-actuated valve assembly of the hose end timer of FIG. 1.
Figure 10:
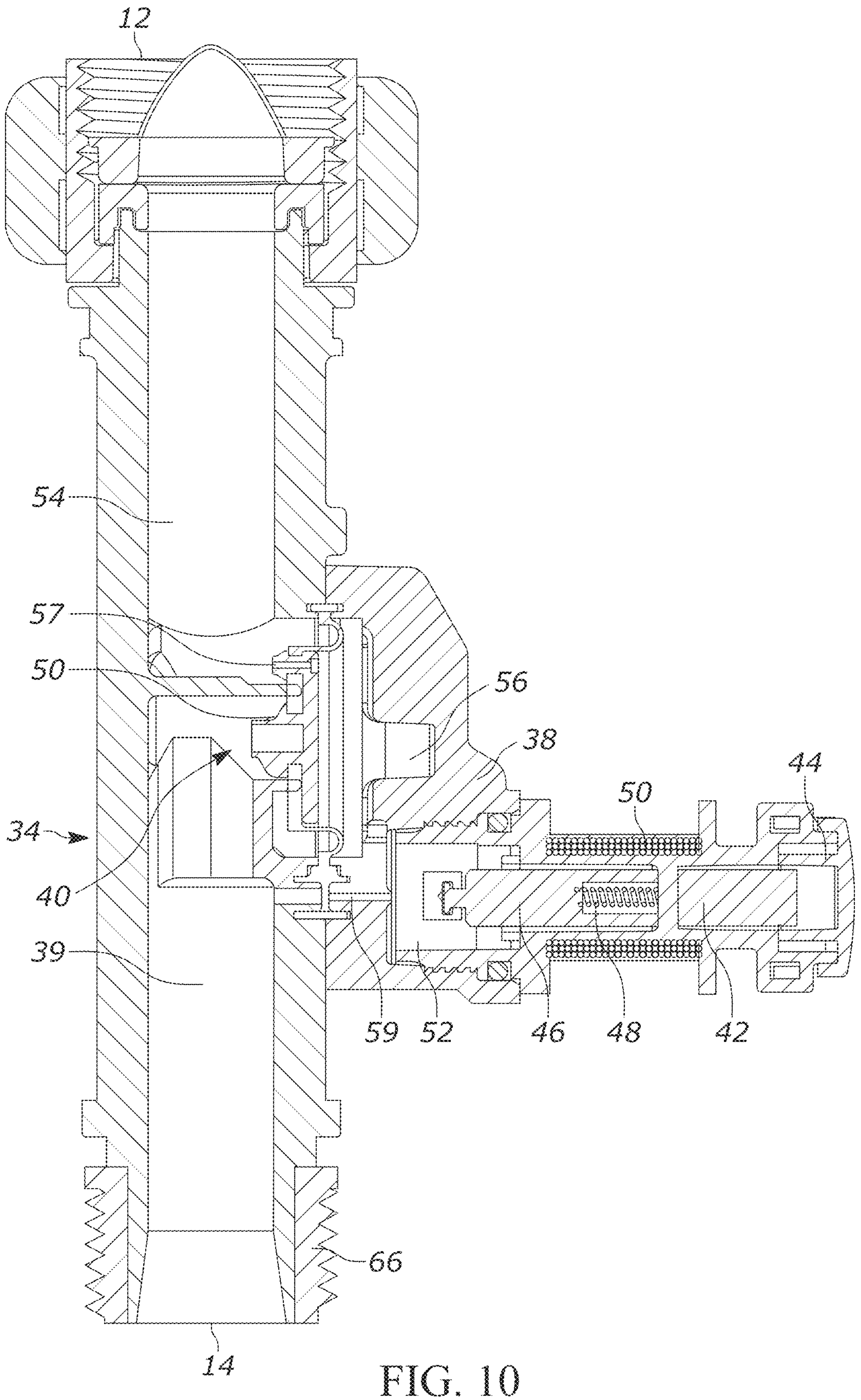
FIG. 10 is a cross-sectional view of the solenoid-actuated valve assembly of the hose end timer of FIG. 9.
Figure 11:
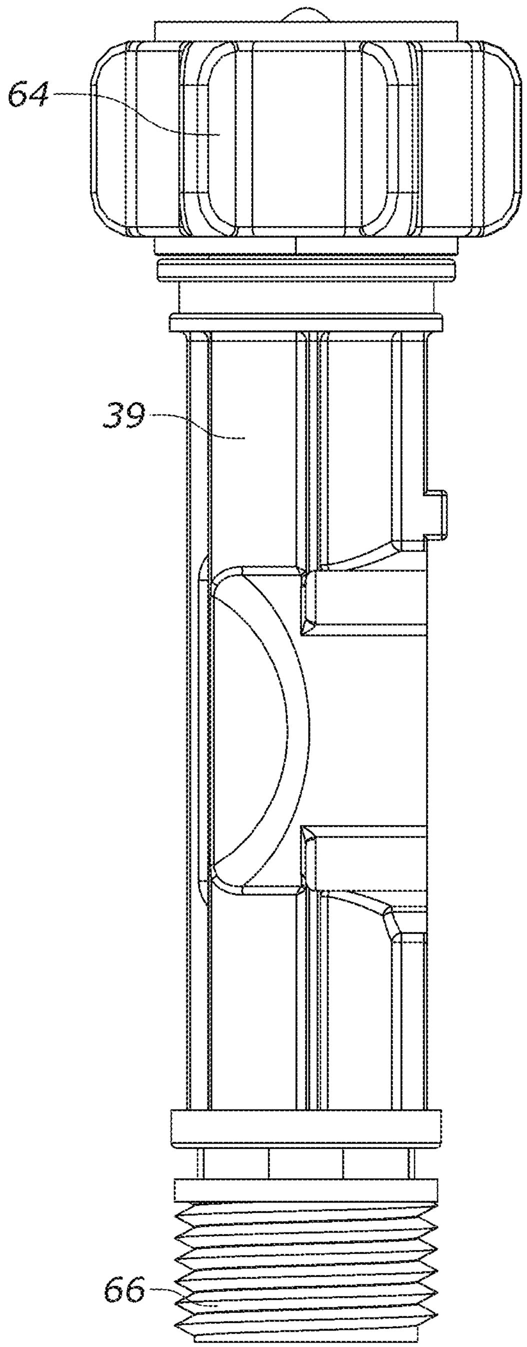
FIG. 11 is a front view of the valve body and inlet and outlet components of the hose end timer of FIG. 1.
Figure 12:
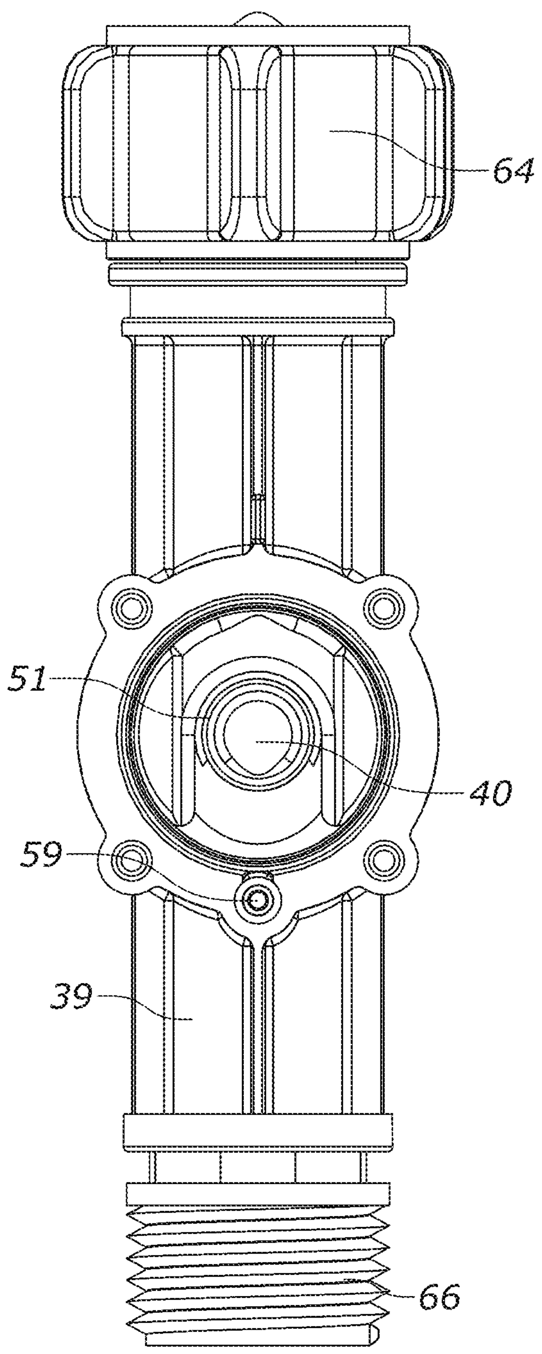
FIG. 12 is a side elevational view of the valve body and inlet and outlet components of FIG. 11.

One preferred form of a solenoid-actuated valve assembly 34 is shown in FIGS. 9 and 10. The figures show the inlet 12 at the top (which may be connected to an outdoor spigot) with the outlet 14 at the bottom (which may be connected to a hose). The valve assembly 34 disposed within the housing 24 preferably uses a magnetically-actuated latching solenoid 38 moving back and forth to open and close the valve 40.

The valve assembly 34 includes a solenoid 38, a valve body 39, the inlet 12, and the outlet 14. In the solenoid 38, a magnet 42 moves to the left to hold a plunger 46 in an open position (shown in FIG. 10) and moves to the right (with respect to the figure) when the plunger 46 is in a closed position. When the valve 40 is in the closed position, the magnet 42 is coupled to a metal member 44. In this rightward position, the magnet 42 is distant from the plunger 46 such that the spring 48 biases the plunger 46 to the left to close the valve 40.

When the coil 50 is energized (in response to a signal to initiate irrigation), the plunger 46 is pulled to the right against the bias of the spring 48, thereby opening the valve 40. In this position, the plunger 46 attracts the magnet 42 such that the magnet 42 is pulled to the left away from the metal member 44. The magnet 42 holds the plunger 46 in this open position, thereby holding the valve 40 open for the duration of irrigation.

When the coil 50 is energized again in the reverse direction (in response to a signal to stop irrigation), the plunger 46 is pushed to the left with the bias of the spring 48, thereby closing the valve 40. When the plunger 46 is in this closed position, the magnet 42 is attracted to and moves to the right to contact the metal member 44. In this rightward position, the magnet 42 does not exert sufficient force to overcome the bias of the spring 48 on the plunger 46, and the spring 48 continues to bias the plunger 46 to the leftward (or closed) position, holding the valve 40 closed.

Movement of the plunger 46 opens and closes the valve 40 by coupling the plunger 46 to a diaphragm 50 that opens and closes the valve 40. The diaphragm 50 is spaced from a valve seat 51 in the open position and is engaged with the valve seat 51 in the closed position. The plunger 46 moves laterally in a plunger chamber 52 that is axially offset from the diaphragm 50, i.e., the plunger chamber 52 is below and to the right of the diaphragm 50. The plunger chamber 52 is in fluid communication with the diaphragm 50 and a pressure chamber 56. The diaphragm 50 is biased to block flow in the conduit 54 (or flow passage) between the inlet and outlet 12, 14, and the valve 40 is closed.

When the plunger 46 is in the leftward (or closed) position, water flows from the inlet 12 and into the pressure chamber 56 via a bleed flow passage 57. Water can flow into the plunger chamber 52, but when the plunger 46 is in the leftward (or closed) position, it cannot flow out to the conduit 54. The diaphragm 50 remains biased to the closed position (to the left) against the valve seat 51, and the valve 40 remains closed.

When the plunger 46 is in the rightward (or open) position, water again flows from the inlet 12 and into the pressure chamber 56 via the bleed flow passage 57 and then into the plunger chamber 52. However, when the plunger 46 is in the rightward (or open) position, water can now flow out to the conduit 54 via a vent flow passage 59. In other words, a certain amount of water can flow from the pressure chamber 56 to the plunger chamber 52 to the conduit 54. This flow results in a pressure drop in the pressure chamber 56 such that pressure exerted against the diaphragm 50 from the inlet water moves the diaphragm 50 away from the valve seat 51, thereby opening the valve 40 and allowing fluid to flow through the valve 34 from the inlet 12 to the outlet 14. In FIG. 10, the plunger has just been moved to the rightward (or open) position, but the diaphragm 50 has not yet moved to an open position.

It should be understood that the solenoid-actuated valve assembly 34 described above is just one example of a valve assembly that may be used with the hose end timer or with other irrigation devices. Other solenoid arrangements are shown in U.S. Pat. Nos. 5,213,303; 7,201,187; and 7,503,348, which are incorporated herein by reference in their entirety. Further, in certain forms, it is contemplated that other types of valves and valve assemblies may be used with the hose end timer or with other irrigation devices that do not involve solenoids.

FIGS. 11-14 show the valve body 39 and inlet and outlet components of the valve assembly 34. The inlet components preferably include a filter screen 58, a collar coupler 60, an internally threaded ring 62, and an external collar 64. The filter screen 58 filters out grit and other debris flowing into the inlet 12 that might otherwise clog the hose end timer 10. The collar coupler 60 is seated within the threaded ring 62 below the threading. The filter screen 58 sits on top of the collar coupler 60 and is retained by the threading in ring 62. The collar coupler 60 is preferably mounted to an upper portion of the valve body 39 by receiving a raised annular rim 61 of the valve body 39 therein. The threaded ring 62 is preferably formed of a suitable metal material to resist damage to the threading (such as stripped threading or cross-threading) that may occur over time. The external collar 64 is preferably formed of a plastic and/or rubber material that is preferably bonded around the threaded ring 62. The external collar 64 allows the user to rotate the internally threaded ring 62 onto the external threading of a faucet spigot.

Figure 15:
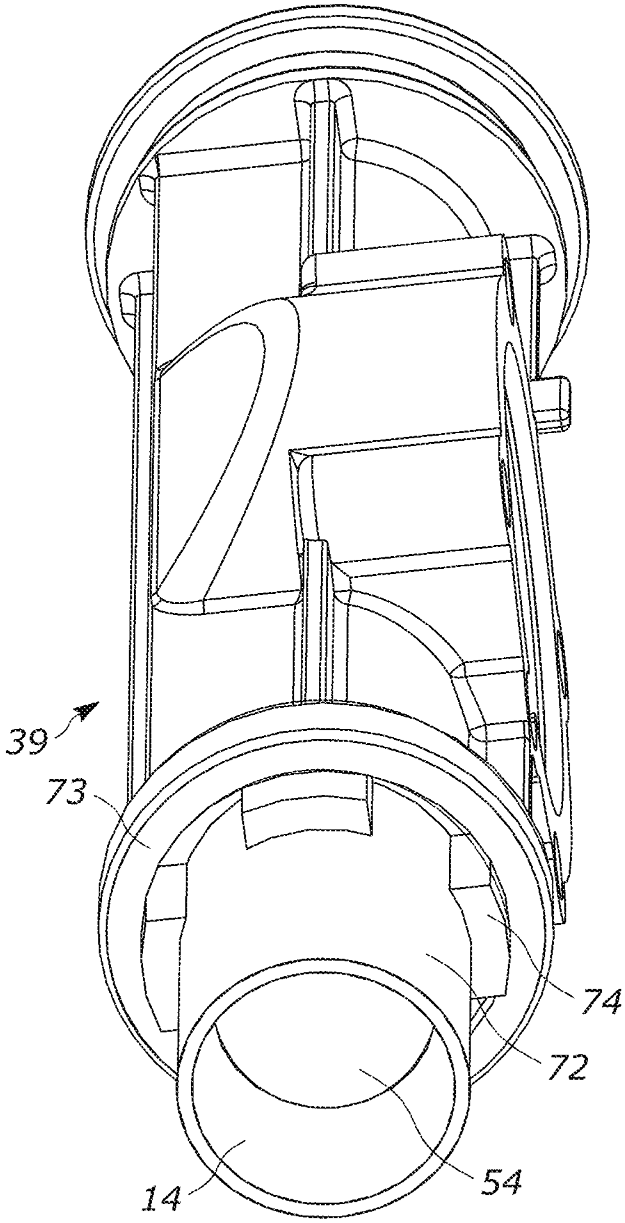
FIG. 15 is a perspective view of the valve body of FIG. 11 showing the lower end of the valve body.
Figure 16:
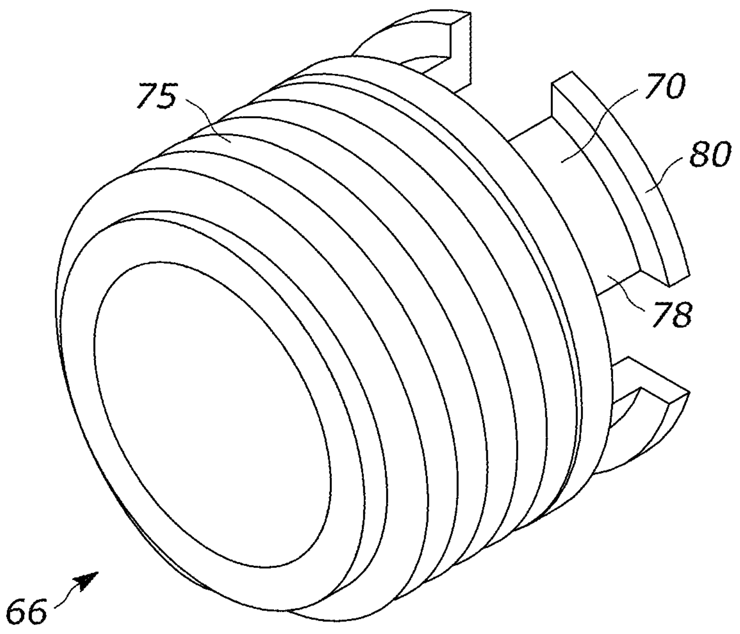
FIG. 16 is a bottom perspective view of an outlet shown in FIG. 11.
Figure 17:
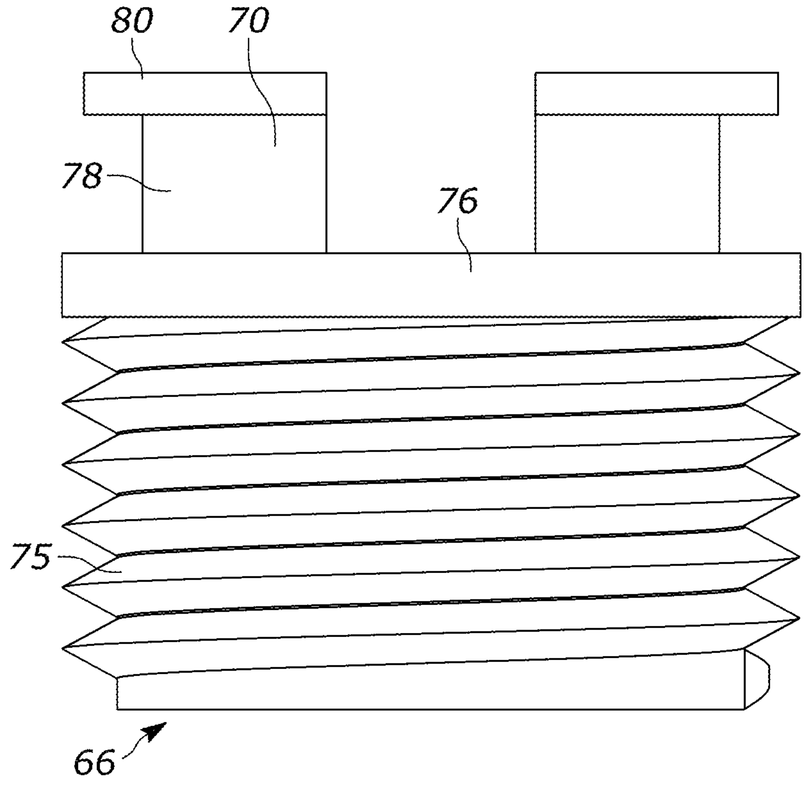
FIG. 17 is a front view of the outlet of FIG. 16.
Figure 18:
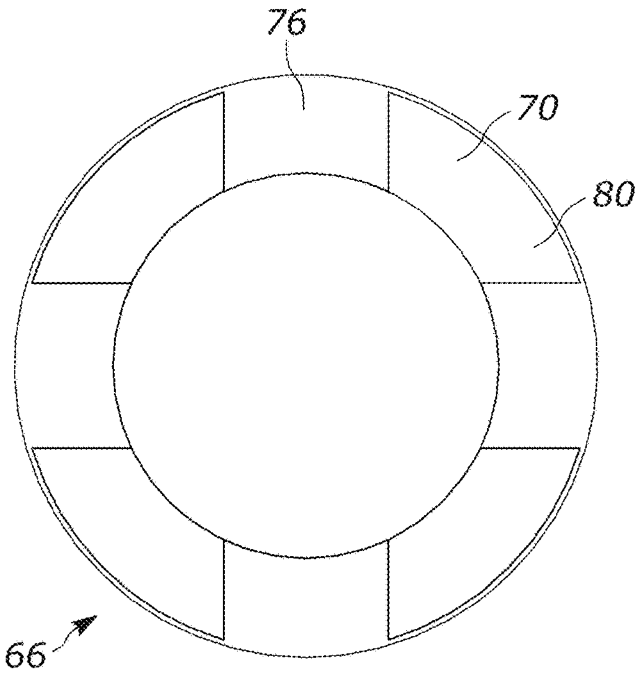
FIG. 18 is a top view of the outlet of FIG. 16.
Figure 19:
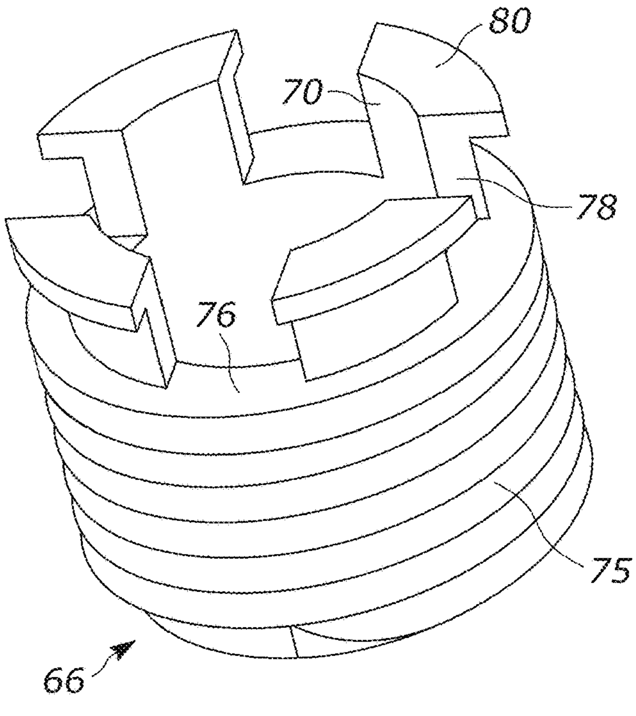
FIG. 19 is a top perspective view of the outlet of FIG. 16.

FIG. 15 shows a view of the unassembled valve body 39, and FIGS. 16-20 show various views of the unassembled outlet body 66. The valve body 39 is preferably formed of a plastic material, while the outlet body 66 is formed of a metal material. The valve body 39 and the outlet body 66 are preferably bonded to one another by an insert molding process. More specifically, the outlet body 66 (which functions as an externally threaded metal collar) is inserted in the mold for the valve body 39 and molded onto the valve body 39 during the molding process. This insertion molding process makes the bodies 39, 66 an integral component, thereby creating strength as well as sealing the flow through the outlet 14. Additionally, the housing 24 includes structure to help locate and retain the outlet body 66 in the correct position.

Figure 22:
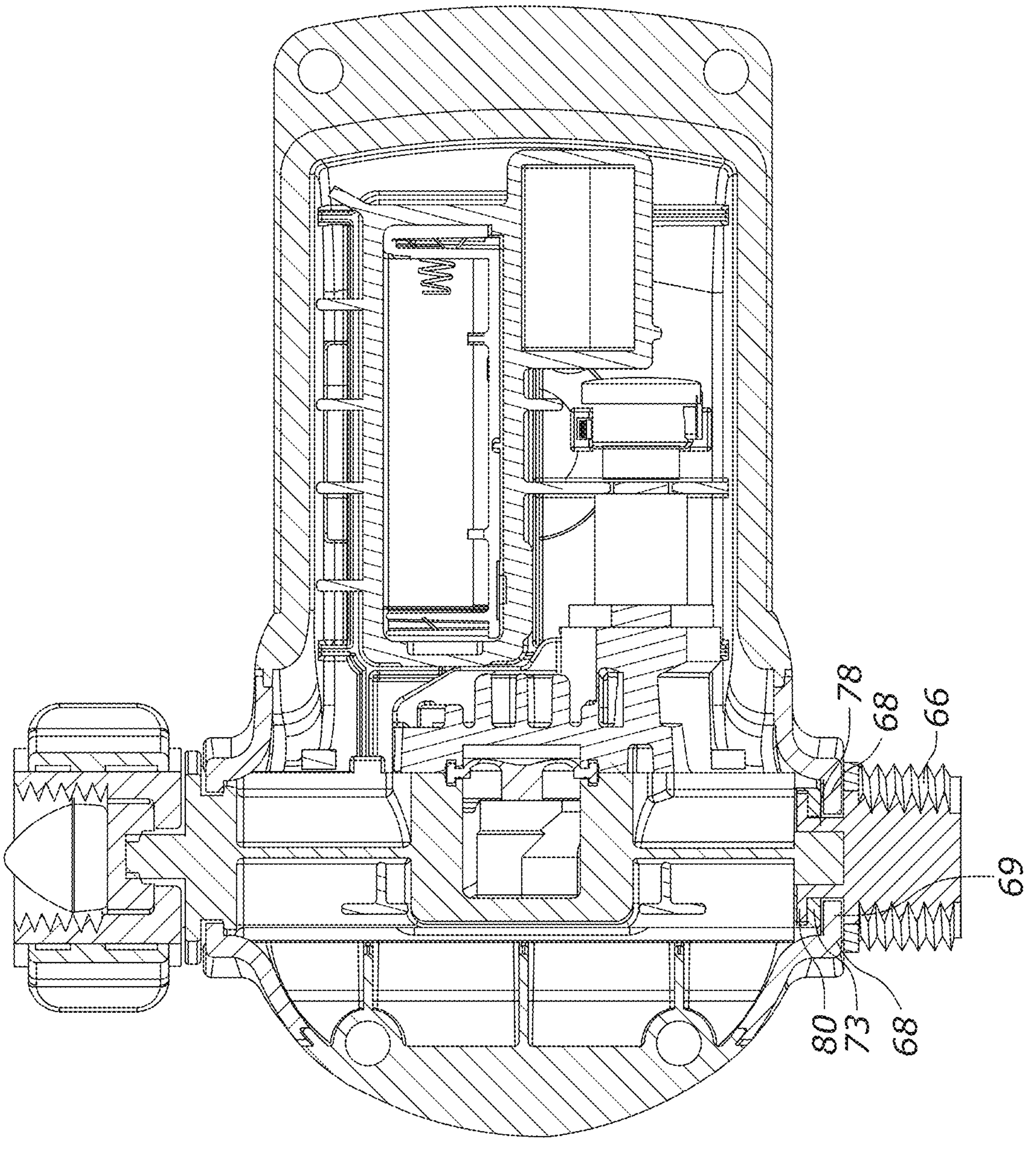
FIG. 22 is a cross-sectional view of the hose end timer of FIG. 1 showing the connection of the outlet, valve body, and housing.

As shown in FIG. 22, the upper housing 26, the lower housing 28, the valve body 39, and the outlet body 66 cooperate to create a secure coupling. The upper housing 26 and lower housing 28 each include a semicircular rim 68 such that, when assembled, the two pieces define an outlet aperture 69 of a predetermined radius. As shown in FIG. 22, this radius is selected such that semicircular rims 68 engage upwardly projecting towers 70 of the outlet body 66. Further, when assembled, these semicircular rims 68 are disposed between portions of the valve body 39 and the outlet body 66, as addressed further below, to establish a secure coupling of these components.

Figure 14:
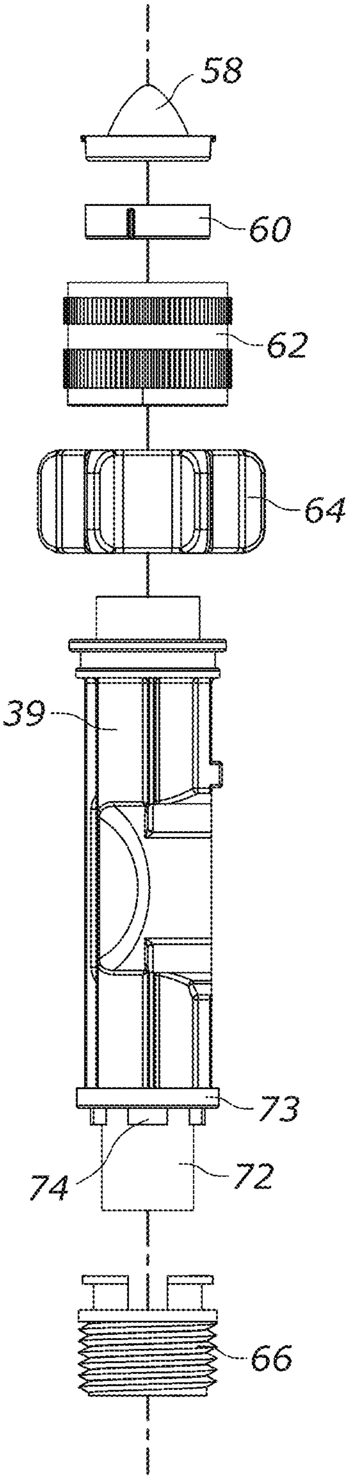
FIG. 14 is an exploded view of the valve body and inlet and outlet components of FIG. 11.

As shown in FIGS. 14 and 15, the lower end of the valve body 39 includes an annular cylindrical portion 72 that defines part of the conduit 54. An annular flange 73 projects radially outwardly and is adjacent to and above tabs 74. In this preferred form, the height of each tab 74 corresponds generally to the thickness of the semicircular rims 68 of the upper and lower housings 26, 28.

The tabs 74 are preferably spaced equidistantly about the annular cylindrical portion 72 and project radially outwardly therefrom. In this form, there are four tabs 74 that are spaced circumferentially about the annular cylindrical portion 72 so as to form gaps through which portions of the outlet body 66 extend. More specifically, the tabs 74 are sized and spaced to allow a tower 70 to extend upwardly between each set of two adjacent tabs 74.

FIGS. 16-19 show different views of the outlet body 66. The outlet body 66 includes external threading 75 for coupling to the internal threading of a hose. The outlet body 66 is preferably in the form of a castellated insert that includes a certain number of towers 70 that project upwardly from an annular ledge 76. The number of towers 70 preferably corresponds to the number of tabs 74, and in this example, there are four towers 70. Each tower 70 includes an upright portion 78 that extends upwardly a predetermined vertical distance from the annular ledge 76. Each upright portion 78 extends between adjacent tabs 74 and terminates in an overhanging portion 80. In this example, the overhanging portions 80 extend radially outwardly such that they overhang the annular ledge 76. The overhanging portion 80 may extend in a direction parallel to the annular ledge 76 or in another direction that otherwise embeds it in the valve body 39.

Figure 20:
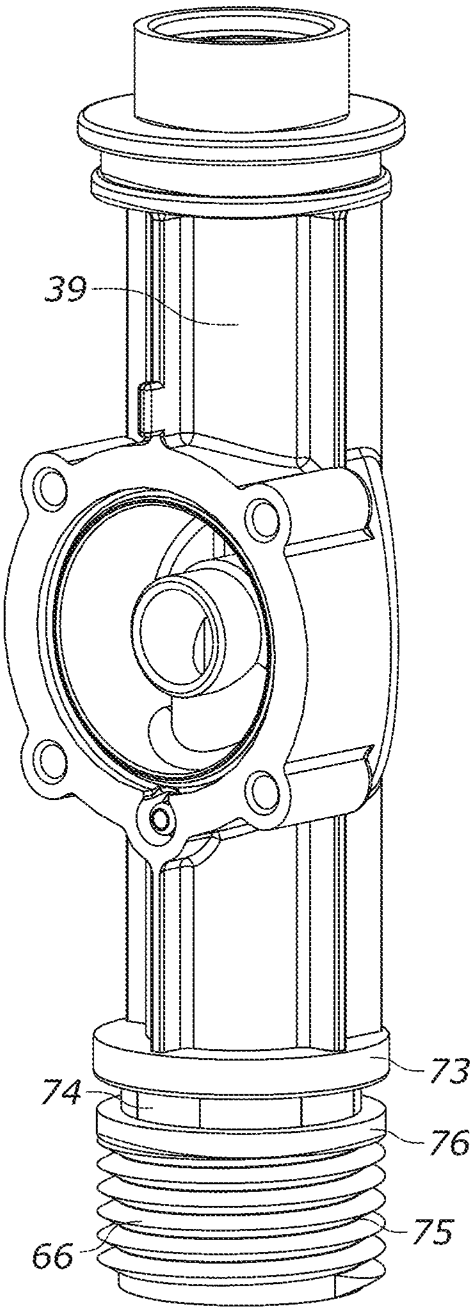
FIG. 20 is a perspective view of the valve body and outlet, as assembled, of FIG. 11.
Figure 21:
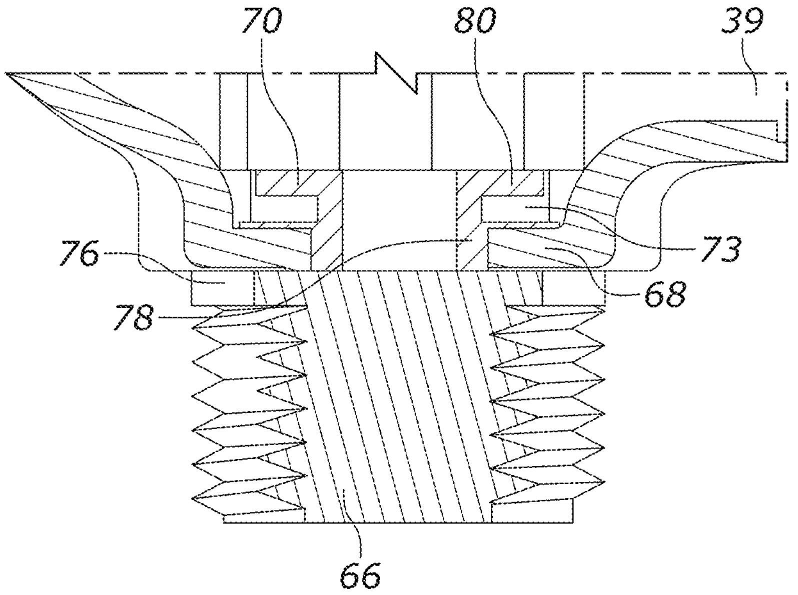
FIG. 21 is a partial cross-sectional view of FIG. 1 showing the connection of the outlet, valve body, and housing.

As shown in FIGS. 20-22, the towers 70 on the castellated outlet body 66 hold the outlet body 66 relative to the valve body 39. The spaces between the upright portions 78 of the towers 70 are preferably filled with plastic material of the valve body 39, i.e., tabs 74, to prevent the outlet body 66 from rotating. As can be seen in FIG. 21, the overhangs 80 are encapsulated within the annular flange 73 of the valve body 39. Thus, the overhangs 80 at the top of the towers 70 are supported by plastic material below the overhangs 80 to prevent the outlet body 66 from pulling off of the valve body 39. Next, the housing 24 also fills a portion of the gap between the over-molded plastic about the overhang 80 and the annular ledge 76 of the outlet body 66. Also, when assembled, the semicircular rims 68 (of the upper and lower housings 26, 28) are received between the annular flange 73 (of the valve body 39) and the annular ledge 76 (of the outlet body 66).

Figure 13:
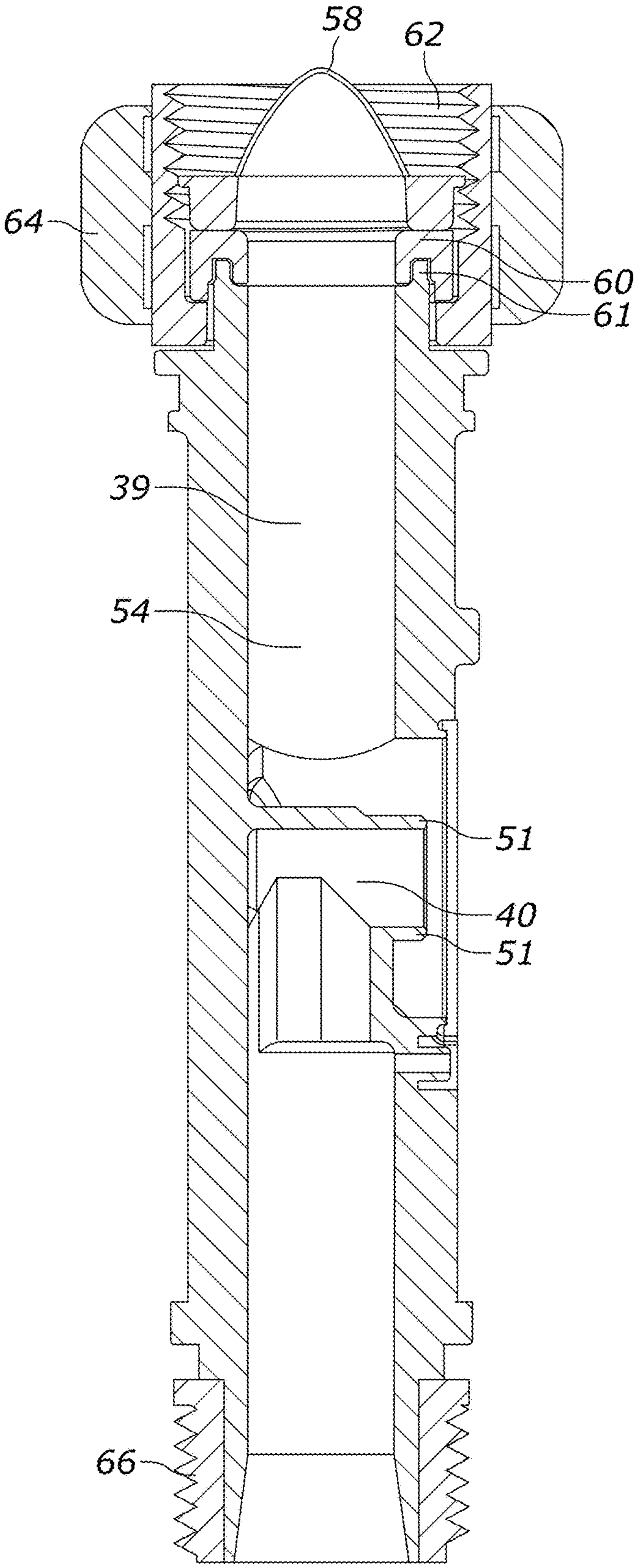
FIG. 13 is a cross-sectional view of the valve body and inlet and outlet components of FIG. 11.

As shown in FIGS. 13 and 22, the annular cylindrical portion 72 of the valve body 39 has a smaller radius than the outlet body 66 such that this annular cylindrical portion 72 engages an inner surface of the outlet body 66. In other words, the annular cylindrical portion 72 is disposed within the outlet body 66. Further, the annular cylindrical portion 72 and the outlet body 66 are coextensive in length. More specifically, the annular cylindrical portion 72 extends, at least, to the bottom of the outlet body 66 so that the flow path is not compromised by a metal to plastic interface that could result in leakage. In other forms, the annular cylindrical portion 72 may extend slightly beyond the outlet body 66 so that water flowing along the flow path is completely encased by the plastic interface. In addition, the thickness of the annular cylindrical portion 72 preferably decreases towards the bottom end of the outlet body 66 to allow clearance for a mating connection with a hose.

One advantage of this design is that it minimizes the machining necessary to produce the outlet body 66. For example, a lathe can create the overall shape and threads, and the castellation can be created on a mill by cutting two channels. Other designs require significantly more work to produce. Although minimizing the needed machinery, the outlet body 66, in combination with the valve body 39 and the housing 24, results in a secure coupling. Further, this outlet body 66 reduces leakage that may otherwise occur over time.

It should be understood that the hose end timer 10 described above is just one example of an irrigation device that may utilize some of the claimed subject matter. It is also contemplated that other irrigation devices might also be used. It is contemplated that other irrigation devices may includes two housing portions configured for engagement with one another to define a housing and that together define an inlet and an outlet. Further, other irrigation devices may utilize a molded body disposed within the housing and defining a flow passage from the inlet to the outlet and may utilize a metal outlet body comprising a threaded portion and at least one projection embedded at least partially into the molded body for coupling the metal outlet body to the molded body.

It will be understood that various changes in the details, materials, and arrangements of parts and components which have been herein described and illustrated in order to explain the nature of the irrigation devices, irrigation valve assemblies, and outlets may be made by those skilled in the art within the principle and scope of the irrigation devices and components thereof, as expressed in the appended claims. Furthermore, while various features have been described with regard to a particular embodiment or a particular approach, it will be appreciated that features described for one embodiment also may be incorporated with the other described embodiments.

What is claimed is:

1. An irrigation valve assembly comprising:

an inlet;

an outlet; and a molded plastic valve body coupled to the inlet and the outlet and defining a flow passage from the inlet to the outlet;

wherein the outlet comprises a metal outlet body, the metal outlet body including a threaded metal portion extending in a first axial direction and at least two metal projections embedded at least partially into the molded plastic valve body for coupling the metal outlet body to the molded plastic valve body, each metal projection including at least a portion extending in a second axial direction opposite the first axial direction and each metal projection terminating in a free end;

wherein the threaded metal portion is fixed against rotation;

wherein the metal outlet body defines a metal bore lined at least in part with the molded plastic valve body;

wherein the metal outlet body comprises an annular ledge adjacent the threaded metal portion of the metal outlet body, the at least two metal projections extending from the annular ledge in the second axial direction and directly into the molded plastic valve body, the at least two metal projections being spaced about and extending from the annular ledge;

wherein each metal projection comprises a first portion extending away from the annular ledge in the second axial direction and a second portion extending away from the first portion in a transverse direction, the second portion of each metal projection being embedded within the molded plastic valve body;

wherein the molded plastic valve body comprises an annular portion with a plurality of tabs spaced about and extending outwardly from the annular portion, a number of tabs corresponding to a number of metal projections of the metal outlet body.

2. The irrigation valve assembly of claim 1, wherein the inlet comprises an internally threaded metal ring for coupling to a water source.

3. The irrigation valve assembly of claim 2, wherein the inlet further comprises an external collar over-molded about the internally threaded metal ring.

4. The irrigation valve assembly of claim 1, further comprising a valve in the molded plastic valve body configured to control flow of fluid through the flow passage.

5. The irrigation valve assembly of claim 1, wherein the first portion of each metal projection of the metal outlet body is disposed between adjacent tabs of the molded plastic valve body.

6. An outlet for an irrigation device, the outlet comprising:

a metal outlet body including a threaded metal portion extending in a first axial direction and defining a bore;

a plastic outlet body lining at least a portion of the bore of the metal outlet body; and at least two metal projections adjacent the threaded metal portion and configured for being at least partially embedded within the plastic outlet body of the irrigation device, the at least two metal projections spaced about and extending in a second axial direction that is opposite from the first axial direction, each metal projection terminating in a free end;

wherein the plastic outlet body comprises an annular ledge adjacent the threaded metal portion of the metal outlet body, the at least two metal projections extending from the annular ledge in the second axial direction and directly into the plastic outlet body, the at least two metal projections being spaced about and extending from the annular ledge;

wherein each metal projection comprises a first portion extending away from the annular ledge in the second axial direction and a second portion extending away from the first portion in a transverse direction, the second portion of each metal projection being embedded within the plastic outlet body;

wherein the plastic outlet body comprises an annular portion with a plurality of tabs spaced about and extending outwardly from the annular portion, a number of tabs corresponding to a number of metal projections of the metal outlet body.

7. An irrigation device comprising:

an inlet;

an outlet;

a first housing portion and a second housing portion configured for engagement with one another to define a housing; and a molded body disposed within the housing and defining a flow passage from the inlet to the outlet;

wherein the outlet comprises a metal outlet body including a threaded metal portion extending in a first axial direction and at least two metal projections embedded at least partially into the molded body for coupling the metal outlet body to the molded body, each metal projection including at least a portion extending in a second axial direction opposite the first axial direction and terminating in a free end;

wherein the metal outlet body defines a metal bore lined at least in part with the molded body;

wherein the metal outlet body comprises an annular ledge adjacent the threaded metal portion of the metal outlet body, the at least two metal projections extending from the annular ledge in the second axial direction and directly into the molded body, the at least two metal projections being spaced about and extending from the annular ledge;

wherein each metal projection comprises a first portion extending away from the annular ledge in the second axial direction and a second portion extending away from the first portion in a transverse direction, the second portion of each metal projection being embedded within the molded body;

wherein the molded body comprises an annular portion with a plurality of tabs spaced about and extending outwardly from the annular portion, a number of tabs corresponding to a number of metal projections of the metal outlet body.

8. The irrigation device of claim 7, wherein:

the first housing portion and the second housing portion together define an outlet aperture;

the first and second housing portions each define a semicircular rim, the two semicircular rims together defining the outlet aperture; and the two semicircular rims are received between the molded body and the annular ledge of the metal outlet body.

9. The irrigation device of claim 7, wherein the irrigation device is a hose end timer.

* * * * *